United States Patent
Tanaka

(10) Patent No.: US 6,791,702 B2
(45) Date of Patent: Sep. 14, 2004

(54) IMAGE FORMING APPARATUS, IMAGE FORMING METHOD, AND STORAGE MEDIUM STORING COMPUTER READABLE PROGRAM THEREIN

(75) Inventor: Tetsuo Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/288,512

(22) Filed: Nov. 6, 2002

(65) Prior Publication Data

US 2003/0067621 A1 Apr. 10, 2003

Related U.S. Application Data

(62) Division of application No. 09/296,577, filed on Apr. 22, 1999, now Pat. No. 6,519,048.

(30) Foreign Application Priority Data

Apr. 28, 1998 (JP) ............................................. 10-119609

(51) Int. Cl.[7] ............................................. G06K 15/00
(52) U.S. Cl. ....................................... 358/1.13; 358/1.1
(58) Field of Search ................................. 358/1.1, 1.13, 358/1.15, 1.14, 1.17, 401, 402, 403; 710/15, 16, 74, 68; 707/10, 102

(56) References Cited

U.S. PATENT DOCUMENTS

| 5,704,020 | A | 12/1997 | Hanyu et al. ............... 358/1.15 |
| 6,222,636 | B1 | 4/2001 | Gerstenberger ............ 358/1.15 |
| 6,519,048 | B1 * | 2/2003 | Tanaka ....................... 358/1.13 |
| 6,681,232 | B1 * | 1/2004 | Sistanizadeh et al. ..... 707/104.1 |
| 2003/0137693 | A1 * | 7/2003 | Nishio ......................... 358/1.15 |

FOREIGN PATENT DOCUMENTS

| JP | 8-130554 | 5/1996 |
| JP | 9-171506 | 6/1997 |

* cited by examiner

*Primary Examiner*—Arthur G. Evans
(74) *Attorney, Agent, or Firm*—Fitzpatrick, Cella, Harper & Scinto

(57) ABSTRACT

In a job issuer of a print or the like, to enable an output result of the print or the like to be promptly, easily, visually confirmed, to enable error information contents of the print or the like to be easily referred, and to enable a management and a maintenance of an output device such as a printer or the like to be also promptly and accurately performed, when a network printer executes a print job, a communication server on the network printer opens image data to display a print result and notifies a host computer on the print job issuer side of a result of the print job including a network resource ID showing the image data.

27 Claims, 7 Drawing Sheets

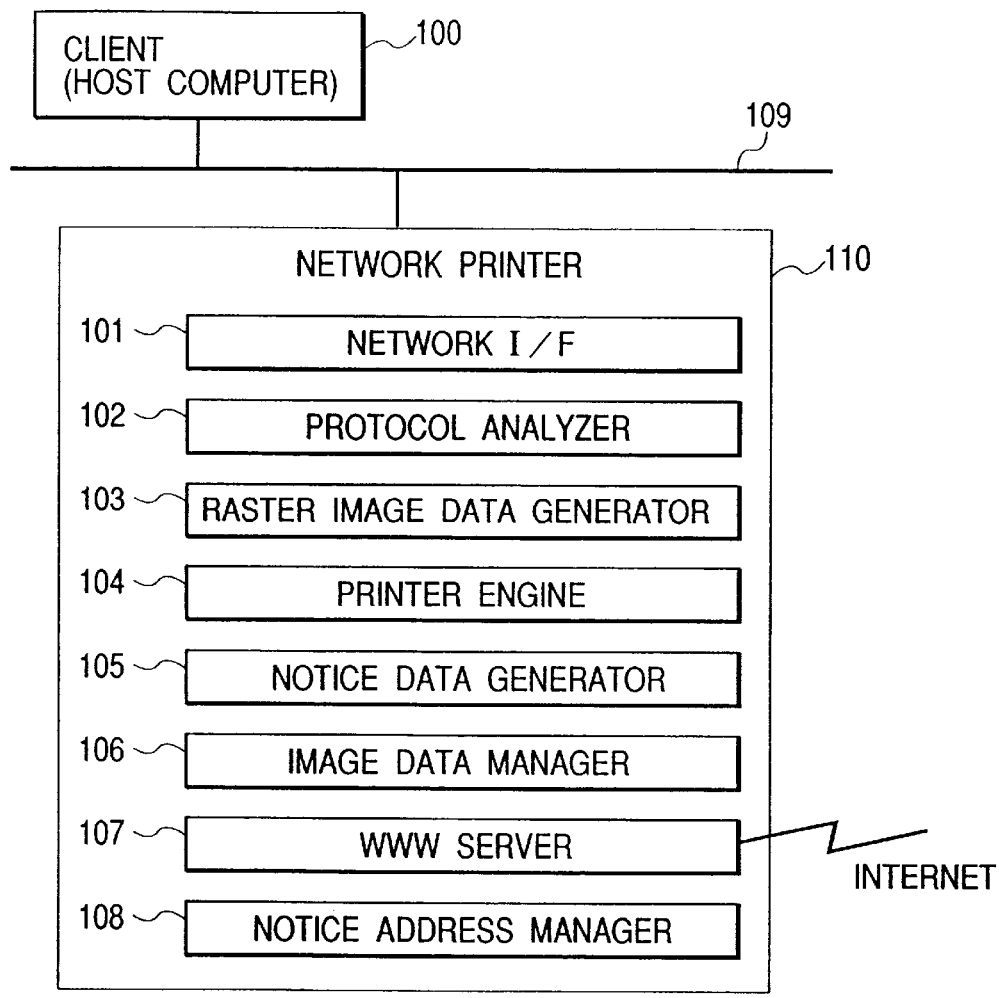

| PROTOCOL NAME | HTTP / 1.1 |
|---|---|
| METHOD NAME | POST |
| HOST NAME | www.foo.co.jp |
| PRINT PROGRAM | / cgi-bin / print.cgi |
| SENDER ADDRESS | taro@foo.co.jp |
| CONNECTION | close |
| CONTENT TYPE | application / x-www-form-urlencoded |
| CONTENT LENGTH | 19 |
| FORM NAME | data |
| FORM VALUE | Hello+World. |
| PRINT DATA | Hello World. |

```
POST / cgi-bin / print. cgi HTTP / 1.1
Host: www. foo. co. jp
Connection: close
Content-Type: application / x-www-form-urlencoded
Content-Length: 49 inputstring=Hello+World. & address=taro@foo. co. jp
```
801

| PROTOCOL NAME | HTTP / 1.1 |
|---|---|
| METHOD NAME | POST |
| HOST NAME | www. foo. co. jp |
| PRINT PROGRAM | / cgi-bin / print. cgi |
| CONNECTION | close |
| CONTENT TYPE | application / x-www-form-urlencoded |
| CONTENT LENGTH | 49 |
| FORM NAME | inputstring, address |
| FORM VALUE | inputstring=Hello+World. & address=taro@foo. co. jp |
| SENDER ADDRESS | taro@foo. co. jp |
| PRINT DATA | Hello World. |

NETWORK PRINTING

PRINT

RESET

ENTER CHR TRAIN(S)

CHR TRAIN(S) TO PRINT

ENTER E-MAIL ADDRESS:

yourname@foo.co.jp

# IMAGE FORMING APPARATUS, IMAGE FORMING METHOD, AND STORAGE MEDIUM STORING COMPUTER READABLE PROGRAM THEREIN This application is a division of application Ser. No. 09/296,577, filed on Apr. 22, 1999 now U.S. Pat. No. 6,519,048.

BACKGROUND OF THE INVENTION

1. Field of the Invention

The invention relates to an image forming apparatus and an image forming method for performing a communication control through a network and relates to a storage medium on which a computer readable program to realize such an image forming method has been stored. More particularly, the invention relates to an image forming apparatus and an image forming method of a network printer or the like such that, for example, when a printing process is performed, a print result is notified to a print job issuer, a printer manager, a printer supporter, or the like by using a server which communicates by a specific protocol or image data contents showing a print result are opened and can be displayed. The invention also relates to a storage medium on which a computer readable program to realize such an image forming method has been stored.

2. Related Background Art

As disclosed in Japanese Patent Application Laid-Open No. 9-171506 or the like, a conventional printing system is constructed such that in a document processing apparatus, when image data is formed from a document received via a network and is printed, a result of a printing process is not notified to a print requester.

In a recent remote print of a client server type, there is considered a method whereby to discriminate whether image data has been printed by a printer or not, a print server which dominates the printer leaves a history of a job even after print data was transmitted to the printer, the print server performs a polling to the printer, thereby discriminating whether the print data transmitted to the printer has been printed or not, and a print end notice is issued to a client who transmitted the print data of the printed job on the basis of a discrimination result and the history of the job. However, even if such a method is used, the print end is merely notified to the client who issued the job and which kind of output has been performed by the printing process cannot be discriminated.

In a system such that it is difficult to perform processes on only the printer side and a host computer shares local-connected printers by a network, the above processes can be realized to a certain extent. For example, as disclosed in Japanese Patent Application Laid-Open No. 8-130554 or the like, when the host computer receives a print notice from the local-connected printer, the host computer analyzes whether the printing process has successfully been performed or failed on the basis of the print notice and notifies the printer of an analysis result by E-mail or the like. As contents which are notified by the E-mail, only the result of the printing process is notified.

In recent years, a printing apparatus which can access to WWW (World Wide Web) by itself has been considered. However, in the case where a print job is received from WWW and the printer performs a print based on the print job, it is presumed that the client who requested the print job instructed through a Web. It is considered that it is impossible to discriminate whether the print data has normally been printed or a print output different from a result presumed by the client has been performed.

In the conventional technique, however, when printing via the network, a message indicative of a print result is not notified or an image as a print result is not transmitted to an issuer of the print job, so that the following problems (a) to (d) occur.

(a) Since the message showing the print result is not notified, it is necessary to inquire of a relational database or the like to manage a print image after the printing.

(b) A result (information such as status of a process showing "success" or "failure", the number of print papers, print time, and the like) of the printing process is merely confirmed and the actual print result cannot be visually confirmed.

(c) In case of a remote print, in many cases, the issuer of the print job and the network printer exist at remote positions with respect to the distance and, to visually confirm the print result, the issuer has to move to the network printer and to confirm the print result or the print result has to be transmitted to the issuer of the print job by means such as mail or the like, so that it takes a moving time of the issuer or a transmitting time of the print result. Further, a case where the client who transmits the print job via WWW requests the print job, for instance, from a quite different place is also considered. In such a case, the user has to make contact with an office of a print output destination and to ask whether desired contents have been outputted or not.

(d) When the print output differs from a desired print result, raster image data formed by the network printer cannot be again used.

SUMMARY OF THE INVENTION

It is, therefore, the first object of the invention to provide an information processing apparatus in which an output result of a print or the like can be promptly, easily, and visually confirmed on an issuer of a job such as a print or the like.

The second object of the invention is to provide an information processing apparatus in which contents of error information of a print or the like can be easily referred and a management and a maintenance of an output device such as a printer or the like can be promptly and accurately performed.

According to the invention, there is provided an image forming apparatus comprising: analyzing means for analyzing a print job received from an external apparatus; image processing means for generating an output image on the basis of an analysis result by the analyzing means and outputting the output image to a printer engine; and image converting means for converting a format of the output image generated by the image processing means and holding a converted image file so that it can be derived from the external apparatus.

The image forming apparatus can communicate with the external apparatus via a network and the Internet.

The image forming apparatus further has: discriminating means for discriminating whether a printing process could normally be performed or not on the basis of a print job received from the external apparatus; and status information generating means for generating a print result by the discriminating means as status information, wherein the status information is held so that it can be obtained from the external apparatus.

The image forming apparatus further has notifying means for notifying the status information showing the print result generated by the status information generating means to a requester of the relevant print job.

The image file is data constructed by only a first page of the output image.

The image forming apparatus further has obtaining means for accessing to the external apparatus on the basis of location information that is designated by the print job in the case where it is analyzed by the analyzing means that the print job is a pull print for obtaining print data from the outside and performing a printing process, and for obtaining the print data to be printed.

When it is determined by the analyzing means that the print job is the pull print, the image converting means forms and holds an image file. When it is decided by the analyzing means that the print job is a push print including the print data, the image converting means does not form any image file.

The image forming apparatus further has: address allocating means for extracting error information from the status information, referring to correspondence table of the error information and an address to notify of an error, and allocating an address every kind of the corresponding error; and notice data generating means for generating data to notify the notice destination on the basis of the status information and the generated error information.

When it is determined by the analyzing means that the requester of the print job is a client who communicates via the Internet, the image converting means forms and holds the image file. When it is decided by the analyzing means that the requester of the print job is a client who communicates via the LAN, the image converting means does not form any image file.

BRIEF DESCRIPTION OF THE DRAWINGS

FIG. 1 is a block diagram showing a construction of a network printer in a system according to an embodiment of the invention;

FIG. 2 is an explanatory diagram showing an example of information that is transmitted to the network printer;

FIG. 8 is a diagram showing an example of information that is transmitted via the Internet to a printer which can perform a Web communication and a table that is formed on the basis of the information; and FIG. 9 is a diagram showing a user interface when instructing a print by using a browser of a client on the Internet.

DETAILED DESCRIPTION OF THE PREFERRED EMBODIMENTS

Figures 3, 4:
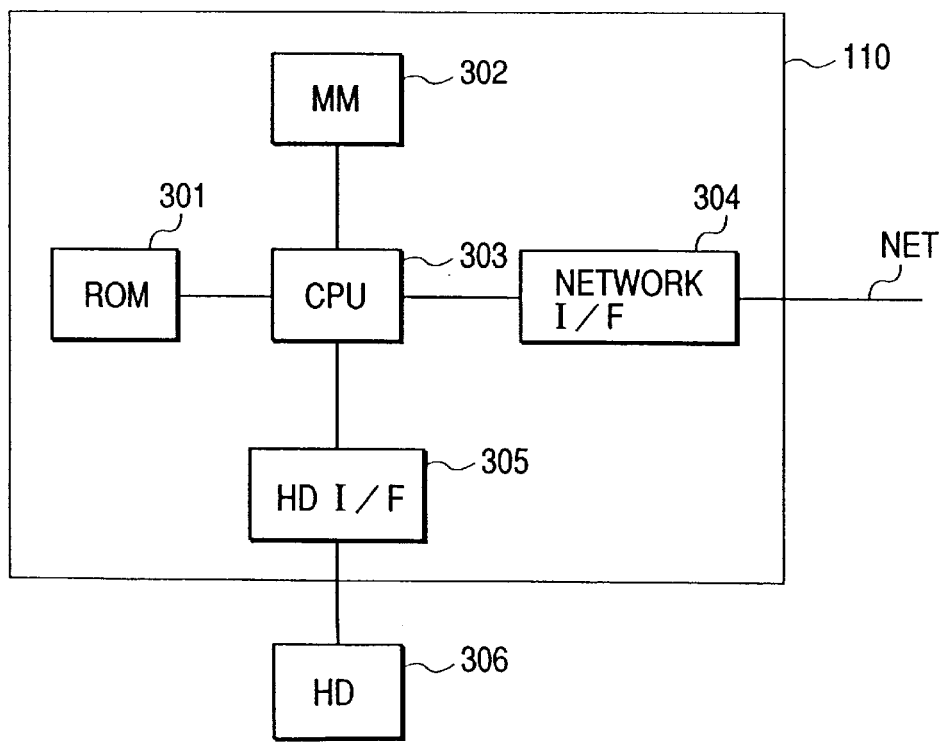
FIG. 3 is an explanatory diagram showing a table in which the contents obtained by analyzing the information in FIG. 2 are written.
FIG. 4 is a block diagram showing a construction of a memory of the network printer.

The invention will now be described in detail hereinbelow with reference to the drawings.

According to a first aspect of the invention, there is provided a system for transmitting and receiving a print job between a print job issuer such as a host computer or the like serving as a print client and a print job issue destination such as a network printer or the like serving as a print server, wherein processes to control such that print result display data to display a print result is formed from raster image data, the print result display data is stored, the print result display data is opened by a specific protocol, and when the print result is notified to the print job issuer, a network resource identifier showing the print result display data is included in the notice information are performed on the print server side.

To transmit and receive the print job between the print job issuer (print client) and the print job issue destination (print server), the system comprises:

(1) means (print job communicating means) for transmitting and receiving the print job through a network by a specific communication protocol;

(2) means (print job storing means) for reading and storing the received print job and communication protocol;

(3) means (print data generating means) for generating print data from the received print job and protocol information;

(4) means (print data downloading means) for reading a network resource identifier included in the received print job, communicating with a server on the network by a corresponding communication protocol, and downloading the network resource; and (5) means (print status storing means) for storing status information of the print job.

In the system comprising the means (1) to (5), in response to the requested print job, the print job communicating means operates so as to transmit the print job from the print client to the print server by using a specific communication protocol determined between the print client serving as a print job issuer and the print server serving as a print job issue destination.

The print job storing means operates on the print server side so as to store the received print job and to store the information used in the protocol as protocol information.

The print data generating means operates as follows in accordance with the case of the push print (the case where the print data is included in the print job) and the case of the pull print (the case where the print data is not included in the print job). In case of the push print:

The print data generating means operates such that a body of print data to be printed and the protocol information are extracted from the print job stored in the print job storing means and the protocol information, the body of print data and the protocol information are supplied into a form for printing (print form), and the print data is generated. In this case, the print data downloading means is not used. In case of the pull print:

The print data generating means operates such that a network resource identifier (ID) showing the print data to be printed is extracted from the print job stored in the print job storing means and is communicated to a server which opens the network resource by a communication protocol corresponding to the network resource ID by using the print data downloading means, the network resource is downloaded, the body of print data is formed from the downloaded data, the body of print data and the protocol information are supplied into the form for printing (print form), and the print data is generated.

In case of normally downloading, information showing that it has normally been downloaded is stored into the print status storing means. In the other cases, information showing that the downloading failed is stored.

The print server transmits the generated print data to the printing apparatus. In case of normally printing, the print server stores information showing that the print data was normally printed into the print status storing means. In the other cases, information indicative of a failure of the printing is stored.

The form for printing can be transmitted to the print server separately from the print data, can be also included as a form in the print data separately from the body of print data to be printed, or can be also prepared as a form of default onto the print server and can be used.

In order to open the print result by a specific communication protocol when the print result is notified to the print job issuer, the system further comprises:

(6) means (raster image converting means) for converting raster image data to display the print result into a specific image format;

(7) means (image data storing means) for storing the converted image data; and (8) means (image data opening means) for opening the stored image data by a specific protocol.

In the system further comprising the means (6) to (8), in response to a requested print job, the print job communicating means operates so as to transmit the print job from the print client to the print server by using a specific communication protocol determined between the print client serving as a print job issuer and the print server serving as a print job issue destination.

Further, to notify the print job issuer of the print result, the system further comprises:

(9) means (address extracting means) for extracting an address of the job issuer from the information stored in the print job storing means;

(10) means (notice data generating means) for extracting the print status information from the print status storing means and generating data to be notified; and

(11) means (data notifying means) for notifying the address of the notice data.

In the system further comprising the means (9) to (11), the notice data generating means operates so that the network resource ID which is opened by the image data opening means is included in the data that is generated.

The data notifying means operates so as to transmit the data generated by the notice data generating means to the address extracted by the address extracting means by using the specific protocol.

The protocol which is used by the data notifying means can be identical to the specific communication protocol determined between the print client and the print server serving as a print job issue destination or another protocol can be also used.

According to a second aspect of the invention, in addition to the construction of the first aspect, processes to control such that when data is generated and printed, the print status information indicative of the result of the printing process is analyzed, the print error information is opened, and when a print error occurs, it is also notified as an error notice to a manager or a supporter who performs a maintenance of the printer, and the print error information can be referred via the network are executed on the print server side.

To notify a proper addressee of the print error information, the system comprises:

(12) means (error information generating means) for extracting the print status information from the print status storing means, converting it into a format which can be opened, and generating the data to be opened;

(13) means (address allocating means) for extracting the error information from the print status information, referring to a correspondence table of errors and addresses, and allocating the address every kind of the corresponding error;

(14) means (notice data generating means) for generating data to be notified from the print status information and the error information generated by the error information generating means; and

(15) means (data notifying means) for notifying the address allocated by the address allocating means of the notice data.

In the system further having the means (13) to (15), when the print error (or an error regarding the downloading in case of the pull print) occurs, a notice message with respect to the print error is transmitted to not only the print job sender but also an addressee corresponding to the manager or supporter who performs a maintenance or management of the printer.

Specific examples will now be described hereinbelow.

[First Embodiment]

The first embodiment of the invention will now be described with reference to FIGS. 1 to 7.

(System Construction)

FIG. 1 is a block diagram showing a construction of a network printer to which the invention is applied.

Reference numeral 100 denotes a client comprising a host computer or the like which issues a print job. In the embodiment the print job is used in meanings in both of a case where it is print data comprising a page description language such as LIPS (registered tradename of Canon Inc.) or the like and a JL (Job Language) to combine it and a case where the print job does not include the print data to be actually printed and comprises location information indicative of a location of the print data and a print command.

Reference numeral 110 denotes a network printer for receiving the print job issued by the client 100 and controlling the print on the basis of the print job. In the embodiment, although explanation will be made on the assumption of the network printer for simplicity of explanation, it is not limited to such an example but a hybrid machine having a facsimile and a copying function by having an image reading unit such as a scanner or the like is also incorporated in the technical field of the invention.

Reference numeral 101 denotes a network interface (I/F) to communicate with the client 100 which is connected via the network.

Reference numeral 102 denotes a protocol analyzer for analyzing the protocol of the print job. For example, when the print job includes the print data, the print data is analyzed in accordance with the page description language and internal intermediate data to generate a raster image is formed.

Reference numeral 103 denotes a raster image data generator for generating raster image data to be actually outputted on the basis of the intermediate data formed from the print job.

Reference numeral 104 denotes a printing unit (printer engine) to print the generated raster image data. The printing unit is a printer engine which is controlled by a well-known technique and is realized by a transfer of an electrophotographic system in the embodiment. As a transfer system, any one of an intermediate transfer system, a transfer drum system, and a transfer belt system can be used.

Reference numeral 105 denotes a notice data generator to generate data to notify of a status of the print job. There are two kinds of statuses. As mentioned above, one of the statuses is status information showing whether the resource to be printed could be normally downloaded on the basis of the location information or not in case of performing the pull print by the print job which does not include the print data. The second status is status information showing whether the print could be normally performed or failed in the printer engine 104. By the status information, the client can know in detail whether the print succeeded or failed. For example, it is possible to know the situations such that: the print was executed although there is no toner of a certain color; an overrun error occurs because a developing speed of the image is slower than a transfer speed; a memory capacity is insufficient and an image deterioration such that the resolution or gradation deteriorates occurs; needles are extinguished during the printing operation although a stapling was instructed; and the like.

Reference numeral 106 denotes an image data manager for converting an image format of raster image data for print output into a format adapted to an application of the client so that it can be visually grasped by the client who requested the print job and for storing the converted format. As an image format, a JPEG image format or a PDF image format is suitable. At the time of the image format conversion, the image data manager also needs to color convert the raster image data as color attributes of YMCK into color attributes of RGB.

Reference numeral 107 denotes a WWW server for receiving a print job or the like as an Internet printing from a client (not shown) having a browser via the Internet, notifying the print job issuer of a result of the print job, downloading corresponding data from the network resource ID from an external WWW server through a database or Internet (not shown) on the network, and opening the stored image data by a specific protocol. The network printer having the WWW server in the embodiment has a host name "www.foo.co.jp".

Reference numeral 108 denotes a notice address manager to manage an address of a notice destination to notify of the result of the print job from the received print job. In the embodiment, the address of the notice destination is an address of the client of the issuer of the print job. When the print job is received via the network (LAN), the address is managed by extracting the address from the print job in correspondence to the IP address or E-mail address. When the print job is received via the Internet, the address is managed by similarly extracting the address from the print job in correspondence to the E-mail address.

Reference numeral 109 denotes a network to transmit the print job, notice, and data to be downloaded. Although not shown, a plurality of clients and a print server to control the order of transmitting the print job to the network printers exist on the network 109.

FIGS. 2 and 3 show examples of the protocol information and the body of print data in case of using an HTTP (HyperText Transfer Protocol) as a protocol to relay the print job.

Reference numeral 201 denotes an example of information (protocol information) which is transmitted from the client 100 to the network printer 110 when the HTTP is used.

Reference numeral 202 denotes a table showing the contents obtained by analyzing the protocol information 201.

The contents of the analyzed protocol information 201 are printed by using "HTTP/1.1" as a communication protocol and by using a print program in which a URI (Uniform Resource Identifier) is designated by "/cgi-bin/print.cgi" for the network printer 110 which is designated by the host name "www.foo.co.jp" by using a method "POST" of the HTTP.

The sender of the print job, shows that it issued a print job to print data in which an address of E-mail is "taro@foo.co.jp", a content type is "application/x-www-form-urlencoded", a content length is equal to 19 bytes, and contents are "data=Hello+World.".

A new-line code consists of two bytes of CR LF (13, 10 as decimal codes). "Connection is "close"" denotes that when a communication session ends, the communication channel is disconnected.

Further, the data whose content type is "application/x-www-form-urlencoded" is divided into the name of the form and the value of the form by a "=" character in accordance with the print program. The value "Hello+World." of the form is converted into "Hello World." by decoding a "+" character to blank SP " " (32 as a decimal code) and shows that the print data was printed.

The print program generates the character train "Hello World." onto the raster image and sends it to the printer engine 104.

Further, the user name "taro" is extracted from the address of the E-mail and the generated raster image is converted into a JPEG image format and is stored in a form which can be referred by URL "http://www.foo.co.jp/taro/print.jpg" as a network resource identifier and is opened.

The notice data generator 105 generates a message including the print status information and the URL (Uniform Resource Locator) and notifies the address of the E-mail.

FIG. 4 is a block diagram mainly showing a construction of the memory of the network printer 110 shown in FIG. 1.

Reference numeral 301 denotes an ROM (read only memory) in which a program to control the network printer 110 by the CPU has been stored.

Reference numeral 302 denotes a main memory (MM).

Reference numeral 303 denotes a CPU (central processing unit) to control a hardware construction of the network printer by the control program stored in the ROM 301.

Reference numeral 304 denotes a Network Interface which is the same as the network I/F 101 in FIG. 1.

Reference numeral 305 denotes an HD interface for reading out data of the contents stored in a secondary storing device and writing the data.

Reference numeral 306 denotes an HD (hard disk) as an external secondary storing device. In the network printer, the print result is held on the HD.

The printer can be connected to the network 109 via the network I/F 304 or can be also directly connected to the print server by a serial cable or a printer cable. The communication to the WWW is not always necessary.

The control program (refer to flowcharts of FIGS. 5 and 6 and the like, which will be explained hereinlater) according to the invention can be stored in the ROM 301, main memory 302, HD 306, or the like or can be also stored as a separate program onto a floppy disk or the like.

(System Operation)

The operation of the system will now be described hereinbelow.

Figure 5:
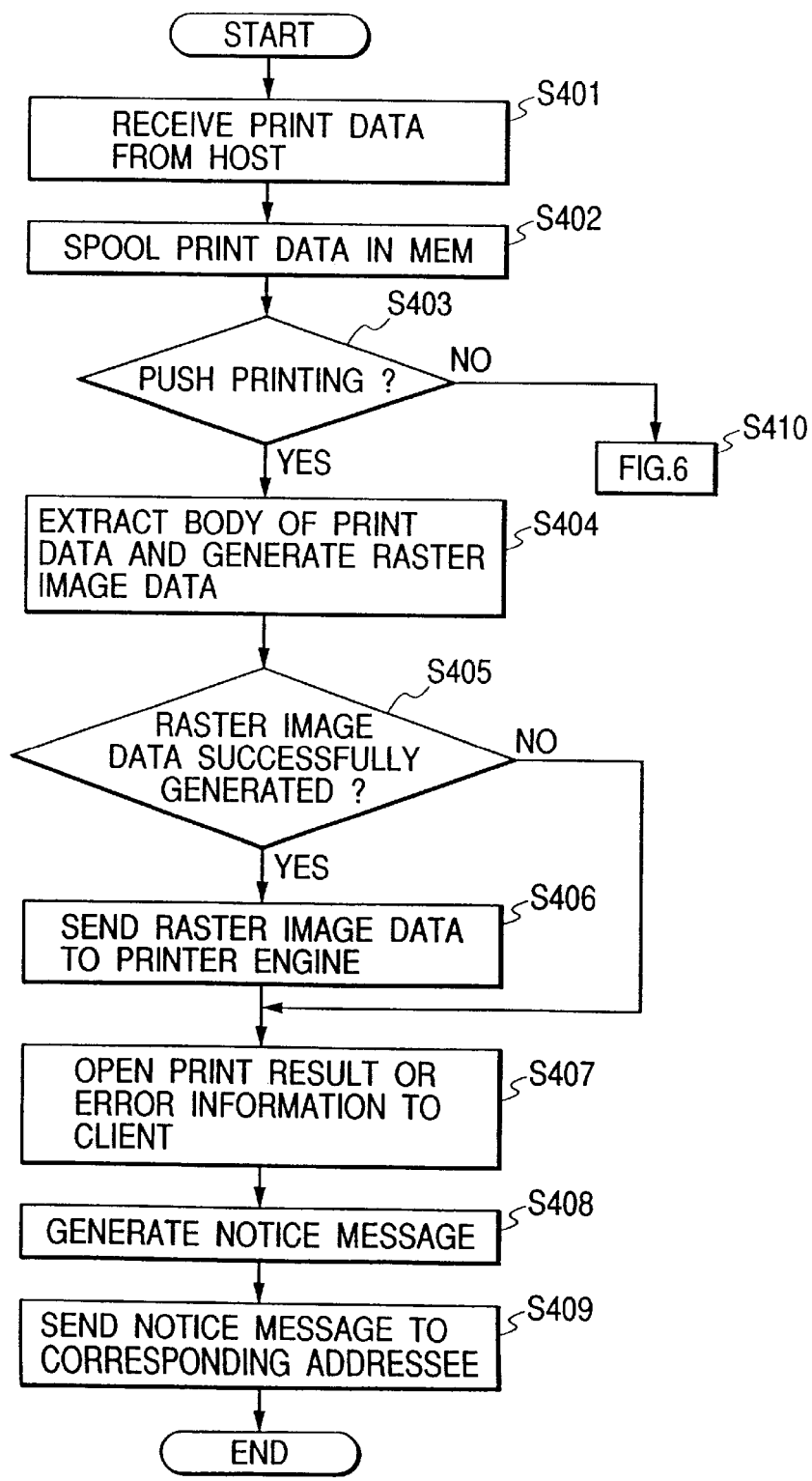
FIG. 5 is a flowchart showing a processing example of a push print.

FIG. 5 is a flowchart showing a processing form in the printing process of the network printer 110 shown in FIG. 1, particularly, a processing form of the push print. The processing form of the pull print is branched to FIG. 6 on the way of the processing procedure.

First in step S401, the WWW server 107 receives the print job via the Internet or the network I/F 101 and the print job communicating means (1) receives the print job from the client 100.

In subsequent step S402, the information of the received print job is spooled into the print job storing means (2) in the MM 302.

In step S403, the protocol analyzer 102 analyzes the information of the print job spooled in, the print job storing means (2), extracts the protocol information, and discriminates whether the print job indicates the push print including the print data or the pull print including the location information showing a holding destination of the print data. When it is determined that the spooled print job is the push print, the processing routine advances to step S404. When it is decided that the print job is the pull print, the processing routine advances to step S410. The process of the pull print in step S410 will be described hereinlater with reference to the flowchart of FIG. 6.

In step S404, the protocol analyzer 102 analyzes the information of the spooled print job and extracts the print data portion as information comprising a body of print data.

The raster image data generator 103 (corresponding to the print data generating means (3) of the first aspect of the invention) forms intermediate data that is peculiar to the printer from the extracted protocol information and the information comprising the body of print data and generates raster image data of an output image on the basis of the intermediate data.

In step S405, whether the print data has successfully been generated in step S404 or not is discriminated. When the print data is successfully generated, the processing routine advances to next step S406. When it fails, step S407 follows.

In step S406, the raster image as generated print data is sent to the printer (printer engine 104 in FIG. 1).

In step S407, when the print data is normally printed, the raster image converting means (6) converts the color attributes of YMCK into the color attributes of RGB on the basis of the raster image data used in the print, converts a format of the RGB image into a JPEG image format, and generates image data to display the print result. The image data is opened to a specific client by the image data opening means (8). When the print data is not normally printed, the error information generating means (12) extracts an error from the status information, converts the format, generates error information, and opens it.

Subsequently in step S408, the notice data generating means (10) generates a notice message from the print status, the protocol information, and the network resource ID showing the image data.

In step S409, the address extracting means (9) extracts the address of the notice destination from the print job and generates a table of the notice destination according to the status. The generated notice message is notified to the address corresponding to the print status. For example, when the print data is normally printed, the notice message is notified to the print job issuer. In case of a small error such as absence of paper, absence of toner, paper jam, or the like, it is notified to the address of the printer manager. In case of a serious error such as hardware error of the printer, error whose cause is unknown, or the like, it is notified to the address of the printer supporter. The processing routine is finished.

Figure 6:
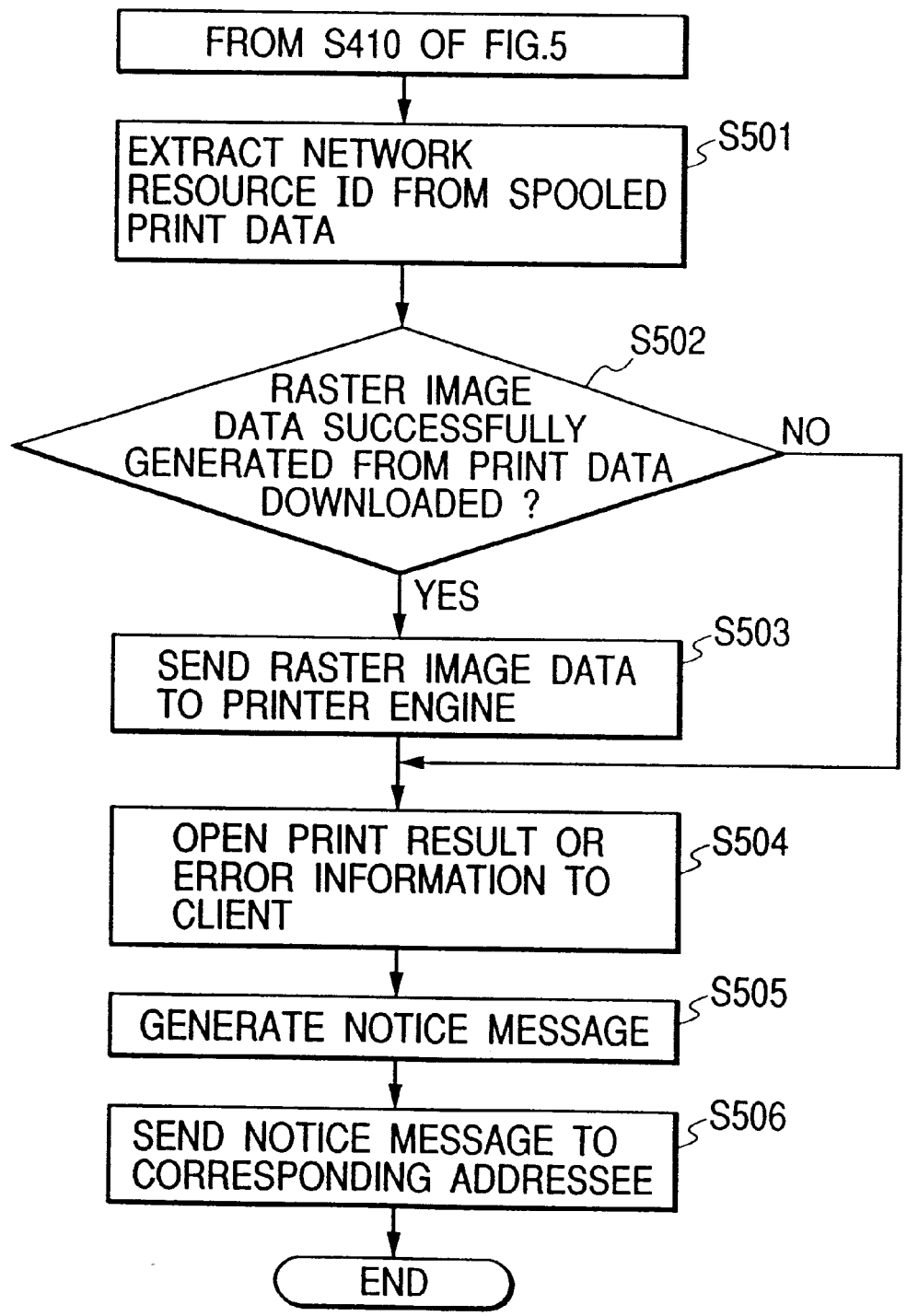
FIG. 6 is a flowchart showing a processing example of a pull print.

FIG. 6 is a block diagram showing a processing form of the pull print of the network printer 110 shown in FIG. 1. This processing routine is executed subsequently to the process in step S410 in FIG. 5.

First, in the case where it is determined that the print is the pull print, in step S501, the information of the print job spooled in the print job storing means (2) is analyzed and the network resource identifier as location information indicative of the existing location of the data to be printed in the print job is extracted.

In step S502, the print data downloading means (4) accesses to the Internet via the WWW server on the basis of the extracted protocol information and network resource ID (URL or the like), downloads the print data shown by the network resource identifier, and generates the raster image data for printing.

Subsequently, whether the raster image data of the print data has successfully been generated or not is discriminated. When the raster image data is successfully generated, the processing routine advances to next step S503. When it fails, step S504 follows.

In step S503, the raster image data based on the print data generated in step S502 is sent to the printer engine 104 as a printer.

In step S504, when the print data is normally printed, the raster image converting means (6) converts the color attributes of YMCK into the color attributes of RGB on the basis of the raster image data used in the printing, converts the format of the RGB color image into the JPEG image format, and generates the image data to display the print result. The image data is opened to a specific client by the image data opening means (8).

When the print data is not normally printed, the error information generating means (12) extracts an error from the status information, converts the format, and generates and opens the error information.

In step S505, the notice data generating means (10) generates a notice message from the print status, the protocol information, and the network resource ID showing the image data.

In step S506, the address extracting means (9) extracts the address of the notice destination from the print job and generates a table of the notice destination according to the status. The generated notice message is notified to the address corresponding to the print status.

For example, when the print data is normally printed, this fact is notified to the print job issuer. In case of a small error such as absence of paper, absence of toner, paper jam, or the like, it is notified to the address of the printer manager. In case of a serious error such as hardware error of the printer, error whose cause is unknown, or the like, it is notified to the address of the printer supporter. The processing routine is finished.

Figure 7:
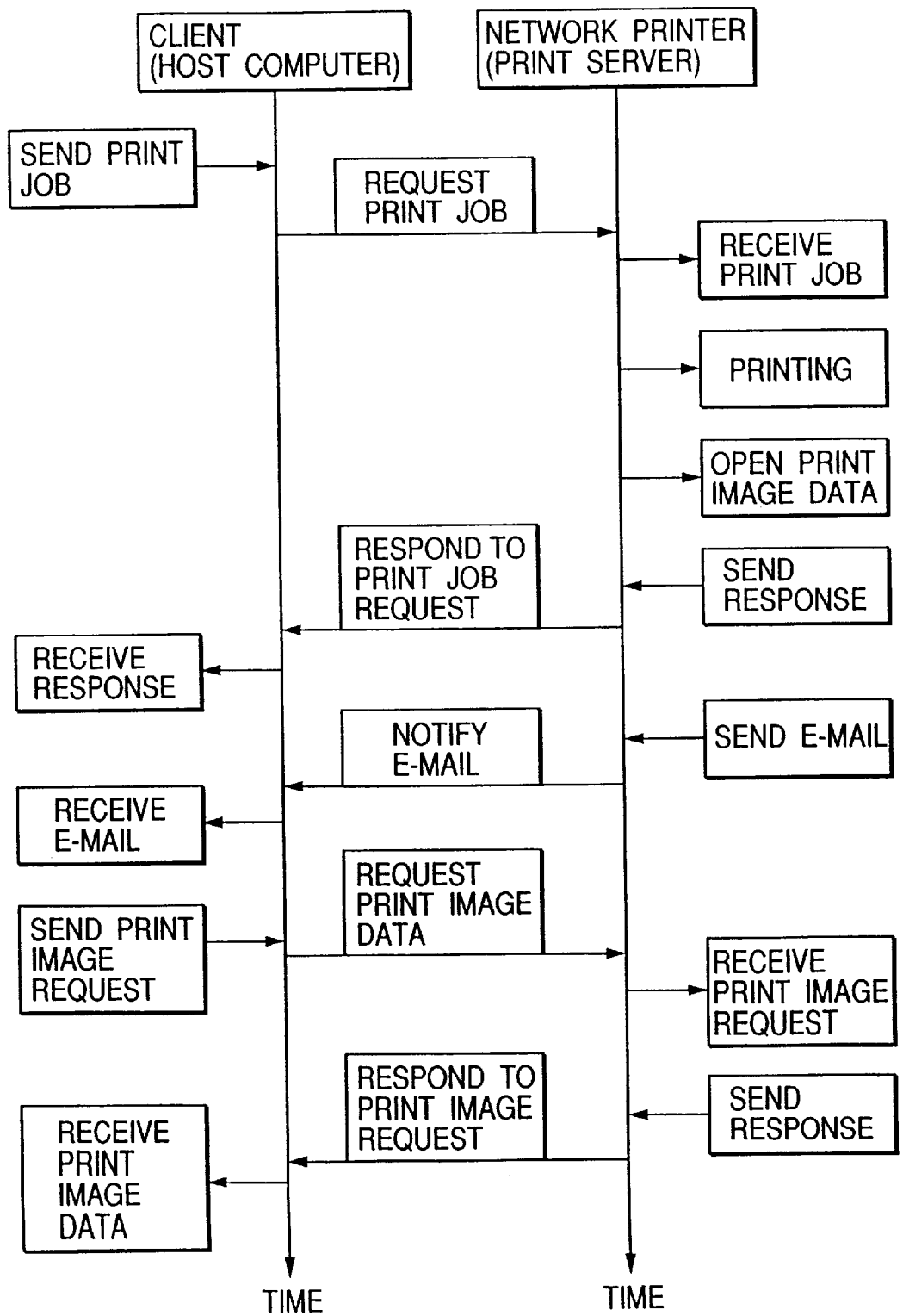
FIG. 7 is a block diagram for time-sequentially explaining a communicating process of the system according to the invention.

FIG. 7 is a conceptual diagram showing a communicating process of the network printer 110 shown in FIG. 1.

An axis of ordinate indicates an elapsed time. The communication between the client 100 and network printer 110 is shown by a lateral arrow of the axis of ordinate. The order of the transmission of a response of the print job and the notification of the E-mail can be reversed or they can be also simultaneously performed by processing them in parallel by the server.

[Second Embodiment]

The second embodiment of the invention will now be described. Explanation with respect to the same portions as those in the first embodiment is omitted and they are designated by the same reference numerals.

In the embodiment, the image data manager 106 forms a thumb nail image for each image data displaying each of the printed pages and arranges the thumb nail images into proper display data, thereby enabling the printed pages to be seen as a list.

For example, HTML (HyperText Markup Language) is used as a proper display data format and each thumb nail image is displayed.

[Third Embodiment]

The third embodiment of the invention will now be described. Explanation with respect to the same portions as those in the first and second embodiments is omitted and they are designated by the same reference numerals.

In the foregoing embodiments, HTTP1.1 has been used as a transfer protocol of the print job. However, in this embodiment, the transfer protocol is not limited to HTTP/1.1 but a communication is performed by the client server system and the invention is applied to an arbitrary communication protocol to transfer the print job.

For example, SMTP (Simple Mail Transfer Protocol) or the like is used as a transfer protocol of the print job. In this case, the address of E-mail is added to the network printer, an SMTP server is activated on the network printer, and the E-mail can be transmitted and received.

[Fourth Embodiment]

The fourth embodiment of the invention will now be described. Explanation with respect to the same portions as those in the first to third embodiments is omitted and they are designated by the same reference numerals.

In the embodiment, when the printed page is opened, an authenticating function is added, thereby limiting so that the printed page can be viewed by only the client who issued the print job.

For example, HTML (HyperText Markup Language) is used as a proper display data format and a site which can view the display data is limited to the host who issued the print job. The communication server generates an information table constructed by the display data and a host name indicative of the client. When the display data is displayed, it is displayed in response to only a display request issued by the client. In this case, there is an advantage such that the print result can be viewed by only the host which issued the print job.

For example, the above notice message is transmitted by E-mail using SMTP (Simple Mail Transfer Protocol) and a user name and a password are designated in the transmission message of the E-mail. The notice data generator 105 generates an information table in which the URL (Uniform Resource Locator) as a network resource ID, the user name, and the password are merged into the transmission message of the E-mail and which is constructed by the URL, user name, and password.

When the notice message is received, in case of referring to the URL as a network resource ID included in the notice message, the communication server promotes to input the user name and the password. Only when the user name and the password which are included in the message are normally inputted with reference to the information table, the opened print result can be viewed. In this case, since the different user name and password can be issued every print job, there is an advantage such that a security of the authenticating function is raised.

[Fifth Embodiment]

The fifth embodiment of the invention will now be described. Explanation with respect to the same portions as those in the first to fourth embodiments is omitted and they are designated by the same reference numerals.

In the embodiment, after the image data manager 106 printed or notified of each image data to display each of the generated and printed pages, if the image data is not referred after the elapse of a predetermined time, it is regarded that there is no need to refer to the image data after that. When the predetermined time elapses, the server deletes it.

There is an effect such that a memory area (main memory 302, HD 306, etc.) of the server can be saved.

[Sixth Embodiment]

The sixth embodiment of the invention will now be described. Explanation with respect to the same portions as those in the first to fifth embodiments is omitted and they are designated by the same reference numerals.

In the embodiment, after the image data manager 106 printed or notified of each image data to display each of the generated and printed pages, if the client of the communication job issuer refers to the image data, it is regarded that there is no need to refer to the image data after that. The server deletes it.

There is an effect such that a memory area (main memory 302, HD 306, etc.) of the server can be saved.

[Seventh Embodiment]

The seventh embodiment of the invention will now be described. Explanation with respect to the same portions as those in the first to sixth embodiments is omitted and they are designated by the same reference numerals.

In the embodiment, after the image data manager 106 printed or notified of each image data to display each of the generated and printed pages, a size of empty area of the memory area of the server is calculated and at a time point when the size of the empty area is equal to or smaller than a predetermined value, the server deletes the image data.

There is an effect such that a memory area (main memory 302, HD 306, etc.) of the server can be saved.

[Eighth Embodiment]

The eighth embodiment of the invention will now be described. Explanation with respect to the same portions as those in the first to seventh embodiments is omitted and they are designated by the same reference numerals.

In the embodiment, after the image data manager 106 notified of each image data to display each of the generated and printed pages, if there is a deleting request from the authenticated client, the server deletes the image data.

There is an effect such that a memory area (main memory 302, HD 306, etc.) of the server can be saved.

[Ninth Embodiment]

The ninth embodiment of the invention will now be described. Explanation with respect to the same portions as those in the first to eighth embodiments is omitted and they are designated by the same reference numerals.

As described in the above embodiments, the raster image converting means (6) format converts all of the pages of the raster image generated on the basis of the print job, stores the converted pages into the image data storing means (7) of the image data manager 106, and opens them to the specific client. To discriminate whether the print job has normally been executed or not, it is not always necessary to confirm the print results of all of the pages. As a simplified method, there is a case where it is sufficient to confirm that the first page has normally been printed. In such a case, if the print result of only the first page is stored, when there are a plurality of pages as a result of the print job, there are advantages such that the size of image data showing the print result is reduced and the processes are further simplified.

Therefore, to reduce a memory capacity to store the images into the printer, in the embodiment, only the first page of the print job is stored.

A processing flow in this case is as follows. That is, in step S407 in FIG. 5 and in step S504 in FIG. 6, when the print data is normally printed, the raster image data of the first page is saved until the printing process and the paper ejecting process are finished. After completion of the paper ejection, the raster image converting means (6) converts the color attributes of YMCK into the color attributes of RGB on the basis of the raster image data of the first page used in the printing, converts the format of the RGB image into the JPEG image format, and generates image data to display the print result. The image data is opened to a specific client by the image data opening means (8). "Specific client" used in the invention denotes a client who has an IP address and E-mail address of the requester of the print job and a network manager set in the network printer. When the print image data request in FIG. 7 is requested from the client to the network printer, the address of the requester is authenticated. That is, when print image data is requested via the LAN, the address is discriminated from the IP address. When it is requested via the Internet, the address is discriminated from the E-mail address. As a result of the authentication, when it is determined that the requester is the correct client, the print image of the first page which was format converted is returned as a response.

As mentioned above, since only the first page of the print image is stored even after the end of the print, there is an effect such that a memory area (main memory 302, HD 306, etc.) of the network printer serving as a print server can be saved.

[Tenth Embodiment]

The tenth embodiment of the invention will now be described. Explanation with respect to the same portions as those in the first to ninth embodiments is omitted and they are designated by the same reference numerals.

In the embodiment, the client accesses to the WWW server of the network printer 110 by using the Web browser, refers to the Web page, inputs text data into the form existing on the Web page, and transmits it to the host of the network printer 110 by using the method "POST" of HTTP. The Web page designates a program in which URI is designated by "/cgi-bin/print.cgi" into a form. For example, a print character train is inputted from the form of the following HTML file.

<!DOCTYPE HTML PUBLIC"-//IETF//DTD HTML i18n/ EN">
<HTML>
<HEAD>
<TITLE> Network Print Page</TITLE>
</HEAD>
<BODY>
<H1> Network Print Page</H1>
<FORM METHOD="POST" ACTION="/cgi-bin/print.cgi">
<P><INPUT TYPE="submit" VALUE="print"></P>
<P><INPUT TYPE="reset" VALUE="reset"></P>
<P> Input character train to be printed:
<TEXTAREA NAME="inputstring" ROWS="12" COLS="50">
Character train to be printed
</TEXTAREA></P>
<P> Input address of E-mail:
<INPUT NAME="address" SIZE="40"
VALUE="yourname@foo.co.jp"></P>
</FORM>
</BODY>
</HTML>

In URI of the browser of the client on the Internet as shown in FIG. 9, by inputting characters to be printed and the address of the E-mail and designating a print button, the print job is transmitted to the network printer 110. For example, in the case where "Hello World." is inputted as a character train which the client wants to print and "taro@foo.co.jp" is inputted as an address of the Email and the print is executed from the Web browser of the client, an HTML file shown at 801 in FIG. 8 is transferred. The WWW server 107 of the network printer 110 receives the data inputted via HTTP. The protocol analyzer 102 analyzes a header portion and a data portion of the HTTP data and transfers data "inputstring=Hello+World.&address=taro@foo.co.jp"

to the print program designated by URI "/cgi-bin/print.cgi". By the print program, the inputted data is first divided into two data "inputstring=Hello+World." and
"address=taro@foo.co.jp"

by a "&" character. Each of the divided character trains is divided into a name of the form and a value of the form by a "=" character. The value "Hello+World." of the form is converted into "Hello World." by decoding a "+" character into a blank SP " " (32 as a decimal code) and is stored in correspondence to the name "inputstring" of the form. The value "taro@foo.co.jp" of the form is stored as shown at 802 in FIG. 8 in correspondence to the name "address" of the form.

The print program forms the character train "Hello World." stored in correspondence to the name "inputstring" of the form into the raster image and sends it to the printer engine 104.

Further, the user name "taro" and the host name "foo.co.jp" are extracted by a "@" character from the character train "taro@foo.co.jp" stored in correspondence to the name "address" of the form. The generated raster image is converted into the JPEG image format and the converted image is stored in a form which can be referred by URL "http://www.foo.co.jp/taro/print.jpg"

as a network resource ID and is opened.

The notice data generator 105 generates a message including the print status information and the URL and notifies the address "taro@foo.co.jp" of the E-mail stored in correspondence to the name "address" of the form.

[Eleventh Embodiment]

The eleventh embodiment of the invention will now be described. Explanation with respect to the same portions as those in the first to tenth embodiments is omitted and they are designated by the same reference numerals.

In this embodiment, the protocol analyzer 102 of the network printer 110 in the first embodiment analyzes the address of the sender, discriminates the job from the specific client, stores only the print result of the job, and deletes the print results of the other jobs together with the paper ejection without leaving them.

For example, in the case where a network is constructed as an in-house LAN by using a private address (192.168.1.x) and by using IP addresses 192.168.1.1 to 192.168.1.255 as a domain (fool.foo.co.jp), the print job from the domain (fool.foo.co.jp) or the print jobs from the clients whose IP addresses are 192.168.1.1 to 192.168.1.255 are deleted as local jobs via the LAN together with the paper ejection without leaving the print results. In the other cases, the print results are left in the image file. In this case, the apparatus operates so that the client information in which the print result is not left is stored in the table and is referred from the protocol analyzer 102.

Therefore, with regard to the print job received by the WWW server via the Internet, the print image is format converted and held. This process is executed as follows.

That is, in step S407 in FIG. 5 and in step S504 in FIG. 6, first, the print job is analyzed, the address of the requester is extracted, and whether the print job is the client in which the address is communicated through the LAN network 109 or the print job received from the WWW server 107 via the Internet is discriminated. As a result of the discrimination, when it is determined that the print job is a print job received from the client of the network, the raster image data is deleted. As a result of the discrimination, when it is decided that the print job is the print job transmitted through the Internet, after the paper with the print data was ejected by the printer engine 104, the raster image data is format converted and is held in the image data manager 106 and is opened to the client of the requester of the print job. As described in the ninth embodiment, the image file which was format converted and generated from the raster image data held in this instance is more efficiently processed by holding the raster image data of the first page.

In case of a specific client (for example, a client such that there is the network printer in the LAN and the print result can be soon confirmed), there is no need to leave the print result. In such a case, therefore, a fine process so as not to leave the print result can be performed. There is an effect such that the print result can be left only in case of needing to leave the print result.

[Twelfth Embodiment]

The twelfth embodiment of the invention will now be described. Explanation with respect to the same portions as those in the first to eleventh embodiments is omitted and they are designated by the same reference numerals.

In this embodiment, the fourth and sixth embodiments are combined and if the client authenticated in the fourth embodiment refers to the image data, it is regarded that the referred image data is unnecessary after that, and the server deletes the, image data.

That is, as shown in FIG. 7, after a print image data response was performed from the network printer to the client, it is regarded that the print result could be notified to the client, so that the image file held in the image data manager 106 is deleted.

With this method, after the confirmation from the client was received, the image file can be deleted, so that there is an effect such that a memory area (main memory 302, HD 306, etc.) of the server can be saved.

In each of the foregoing embodiments, the relation between the host computer and the network printer has been mentioned as an example. However, the invention is not limited to such an example. For instance, another information equipment such as copying machine, facsimile, or the like can be also used as an output device except for the printer.

The invention is not limited to the printing process but similar operation and effects can be also derived by the other information processes.

The invention can be applied to a system constructed by a plurality of equipment or can be also applied to an apparatus comprising one equipment. The invention can be also obviously applied to a case where it is accomplished by supplying a program to a system or an apparatus. In this case, a program shown by software to accomplish the invention is stored onto a memory medium and by reading out the program from the memory medium and loading into the system or apparatus, the system or apparatus can obtain the effects of the invention.

According to the invention as described above, when the network printer executes the print job, the communication server on the network printer opens the image data to display the print result and the result of the print job including the network resource ID showing the image data is notified to the print job issuer. Therefore, the print job issuer can visually confirm the print result via the image data to display the print result from the network resource ID.

According to the invention, if an error occurs when the network printer executes the print job, the communication server on the network printer opens the error information contents to display the print result. The result of the print job including the network resource ID showing the error information contents is notified to the addressee corresponding to the print status. Therefore, not only the print job issuer obtains the error information but also the error information contents are notified to the manager of the printer or the person who performs the maintenance. It is possible to promptly and accurately cope with the error information contents of the print.

What is claimed is:

1. An image processing apparatus comprising:

analyzing means for analyzing information received from an external apparatus via Internet;

image processing means for performing image processing, based on an analysis result of said analyzing means;

discriminating means for discriminating whether the image processing has been normally performed by said image processing means, based on the information received from the external apparatus;

message sending means for sending a message, indicating that the image processing has been normally performed, to the external apparatus at an address included in the information received from the external apparatus, if said discriminating means discriminates that the image processing has been normally performed; and error notifying means for referring to an address correspondence table that includes at least one address to be notified of an error, and for sending an error notification to the at least one address, if said discriminating means discriminates that the image processing has not been normally performed.

2. An image processing apparatus according to claim 1, wherein said image processing means forms an output image based on the analysis result and outputs the formed output image to a printing unit.

3. An image processing apparatus according to claim 1, wherein the address correspondence table includes at least one address allocated for every error type, and said error notifying means determines an error type and sends the error notification to the at least one address allocated for the determined error type, if said discriminating means discriminates that the image processing has not been normally performed.

4. An image processing apparatus according to claim 1, further comprising generating means for generating a view image in a file format that may be viewed in the external apparatus, wherein the view image indicates output contents of the information received from the external apparatus.

5. An image processing apparatus according to claim 4, further comprising:

managing means for managing the view image generated by said generating means; and transmitting means for transmitting the view image managed by said managing means to the external apparatus via the Internet, in response to a request from the external apparatus.

6. An image processing apparatus according to claim 5, further comprising obtaining means for, if said analyzing means analyzes that the information received from the external apparatus indicates a pull print, in which print data is obtained from the external apparatus to perform a printing process, accessing the external apparatus, based on location information designated by the received information, and obtaining print data to be printed.

7. An image processing apparatus according to claim 6, wherein,
if said analyzing means analyzes that the received information indicates the pull print, said generating means generates the view image, and,
if said analyzing means analyzes that the received information indicates a push print, in which print data is included, no view image is generated by said generating means.

8. An image processing apparatus according to claim 1, wherein said apparatus comprises a facsimile apparatus.

9. An image processing apparatus according to claim 1, wherein
said message sending means sends the message via e-mail, and
said error notifying means sends the error notification via e-mail.

10. An image processing method, comprising the steps of:
analyzing information received from an external apparatus via Internet;
performing image processing, based on an analysis result in said analyzing step;
discriminating whether the image processing has been normally performed in said step of performing image processing, based on the information received from the external apparatus;
sending a message, indicating that the image processing has been normally performed, to the external apparatus at an address included in the information received from the external apparatus, if it is discriminated in said discriminating step that the image processing has been normally performed; and,
if it is discriminated in said discriminating step that the image processing has not been normally performed, referring to an address correspondence table that includes at least one address to be notified of an error, and sending an error notification to the at least one address.

11. An image processing method according to claim 10, wherein said step of performing image processing forms an output image based on the analysis result and outputs the formed output image to a printing unit.

12. An image processing method according to claim 10, wherein
the address correspondence table includes at least one address allocated for every error type, and,
if it is discriminated in said discriminating step that the image processing has not been normally performed, an error type is determined and the error notification is sent to the at least one address allocated for the determined error type.

13. An image processing method according to claim 10, further comprising the step of generating a view image in a file format that may be viewed in the external apparatus, wherein the view image indicates output contents of the information received from the external apparatus.

14. An image processing method according to claim 13, further comprising the steps of:
managing the view image generated in said generating step; and
transmitting the view image managed in said managing step to the external apparatus via the Internet, in response to a request from the external apparatus.

15. An image processing method according to claim 14, further comprising the step of, if said analyzing step analyzes that the information received from the external apparatus indicates a pull print, in which print data is obtained from the external apparatus to perform a printing process, accessing the external apparatus, based on location information designated by the received information, and obtaining print data to be printed.

16. An image processing method according to claim 15, wherein,
if said analyzing step analyzes that the received information indicates the pull print, the view image is generated in said generating step, and,
if said analyzing step analyzes that the received information indicates a push print, in which print data is included, no view image is generated in said generating step.

17. An image processing method according to claim 10, wherein said method is performed in a facsimile apparatus.

18. An image processing method according to claim 10, wherein
the message is sent via e-mail, and
the error notification is sent via e-mail.

19. An image processing apparatus comprising:
an analysis unit adapted to analyze information received from an external apparatus via Internet;
an image processing unit adapted to perform image processing, based on an analysis result of said analysis unit;
a discrimination unit adapted to discriminate whether the image processing has been normally performed by said image processing unit, based on the information received from the external apparatus;
a message sending unit adapted to send a message, indicating that the image processing has been normally performed, to the external apparatus at an address included in the information received from the external apparatus, if said discrimination unit discriminates that the image processing has been normally performed; and
an error notification unit adapted to refer to an address correspondence table that includes at least one address to be notified of an error, and to send an error notification the at least one address, if said discrimination unit discriminates that the image processing has not been normally performed.

20. An image processing apparatus according to claim 19, wherein said image processing unit forms an output image based on the analysis result and outputs the formed output image to a printing unit.

21. An image processing apparatus according to claim 19, wherein the address correspondence table includes at least one address allocated for every error type, and said error notification unit determines an error type and sends the error notification to the at least one address allocated for the determined error type, if said discrimination unit discriminates that the image processing has not been normally performed.

22. An image processing apparatus according to claim 19, further comprising a generation unit adapted to generate a view image in a file format that may be viewed in the external apparatus, wherein the view image indicates output contents of the formation received from the external apparatus.

23. An image processing apparatus according to claim 22, further comprising:
- a management unit adapted to manage the view image generated by said generation unit; and
- a transmission unit adapted to transmit the view image managed by said management unit to the external apparatus via the Internet, in response to a request from the external apparatus.

24. An image processing apparatus according to claim 23, further comprising an obtaining unit adapted to, if said analysis unit analyzes that the information received from the external apparatus indicates a pull print, in which print data is obtained from the external apparatus to perform a printing process, access the external apparatus, based on location information designated by the received information, and obtain print data to be printed.

25. An image processing apparatus according to claim 24, wherein,
- if said analysis unit analyzes that the received information indicates the pull print, said generation unit generates the view image, and,
- if said analysis unit analyzes that the received information indicates a push print, in which print data is included, no view image is generated by said generation unit.

26. An image processing apparatus according to claim 19, wherein said apparatus comprises a facsimile apparatus.

27. An image processing apparatus according to claim 19, wherein
- said message sending unit sends the message via e-mail, and
- said error notification unit sends the error notification via e-mail.

* * * * *